(12) United States Patent
Carlier (10) Patent No.: US 12,179,876 B2
(45) Date of Patent: Dec. 31, 2024

(54) BICYCLE HANDLEBAR (71) Applicant: MA Micro Limited, London (GB)

(72) Inventor: Ties Jonan Midas Carlier, Amsterdam (NL)

(73) Assignee: MA Micro Limited, London (GB)

( * ) Notice: Subject to any disclaimer, the term of this patent is extended or adjusted under 35 U.S.C. 154(b) by 0 days.

(21) Appl. No.: 17/775,083

(22) PCT Filed: Nov. 9, 2020

(86) PCT No.: PCT/NL2020/050705
§ 371 (c)(1),
(2) Date: May 6, 2022

(87) PCT Pub. No.: WO2021/091391
PCT Pub. Date: May 14, 2021

(65) Prior Publication Data
US 2022/0379992 A1 Dec. 1, 2022

(30) Foreign Application Priority Data
Nov. 7, 2019 (NL) ........................................ 2024186

(51) Int. Cl.
*B62K 21/12* (2006.01)
*B62K 21/22* (2006.01)

(52) U.S. Cl.
CPC ............. *B62K 21/12* (2013.01); *B62K 21/22* (2013.01)

(58) Field of Classification Search
CPC ........ B62K 21/12; B62K 21/22; B62K 21/26; B62K 25/02; B62L 3/023; B62J 11/19;
(Continued)

(56) References Cited

U.S. PATENT DOCUMENTS 4,771,649 A * 9/1988 Modolo ................. B62L 3/023
74/489
4,917,397 A 4/1990 Chonan
(Continued)

FOREIGN PATENT DOCUMENTS

CN 206087127 U 4/2017
DE 202017102939 U1 6/2017
(Continued)

OTHER PUBLICATIONS

Machine translation of JP 4502551 B2, Sakamoto et al., Jul. 14, 2010. (Year: 2010).*
(Continued)

*Primary Examiner* — Vinh Luong
(74) *Attorney, Agent, or Firm* — The Webb Law Firm (57) ABSTRACT

A bicycle handlebar, for a bicycle, is arranged for providing at least one function for the purpose of at least one subsystem of the bicycle. The bicycle handlebar includes a head tube part that during use, at least partly, substantially extends along the head tube, a left handlebar bend with a handle end that extends to the left side from the head tube part, and a left handlebar bend with a handle end that extends to the right side from the head tube part. The bicycle handlebar includes at least an internal feedthrough channel from at least one of the left handlebar bend and right handlebar bend and wherein the at least one internal feedthrough channel extends into the head tube part.

14 Claims, 7 Drawing Sheets

(58) Field of Classification Search
CPC .. B62M 25/08; B62M 2025/006; B62M 9/10; B60B 27/026; B60B 27/065; H04B 5/73
See application file for complete search history.

(56) References Cited

U.S. PATENT DOCUMENTS

| | | |
|---|---|---|
| 2003/0226420 A1 | 12/2003 | Oi et al. |
| 2004/0163897 A1 | 8/2004 | Becocci et al. |
| 2005/0029772 A1* | 2/2005 | Oi .................. B62J 11/19 280/281.1 |
| 2005/0057017 A1* | 3/2005 | Hara ............... B62K 19/32 280/279 |
| 2005/0109150 A1 | 5/2005 | Chiang et al. |
| 2005/0258617 A1* | 11/2005 | Ueno ............... B62M 25/02 280/280 |
| 2006/0086588 A1* | 4/2006 | Tsumiyama ....... B62L 3/023 192/217 |
| 2006/0145446 A1 | 7/2006 | Schmider |
| 2011/0162929 A1 | 7/2011 | Moore |
| 2012/0160625 A1* | 6/2012 | Jordan ............. B60T 11/16 188/344 |
| 2013/0154234 A1* | 6/2013 | Shadwell ......... B62K 21/02 280/279 |
| 2015/0291247 A1* | 10/2015 | Fukao .............. B62K 23/06 74/491 |
| 2016/0339985 A1* | 11/2016 | Lund ................ G05G 1/04 |
| 2017/0080993 A1* | 3/2017 | Bierwerth ........ B62M 25/08 |
| 2017/0369125 A1* | 12/2017 | Katsura ............. B62M 6/55 |
| 2018/0251188 A1* | 9/2018 | Durdevic .......... B62M 6/55 |
| 2018/0273132 A1 | 9/2018 | Huang |
| 2019/0152457 A1* | 5/2019 | Ruopp .............. B62L 3/023 |
| 2019/0185104 A1* | 6/2019 | Liu .................. G06F 3/00 |
| 2019/0315436 A1* | 10/2019 | Wu .................. B62M 25/08 |
| 2019/0382081 A1* | 12/2019 | Bierwerth ........ B62K 21/12 |
| 2022/0402571 A1* | 12/2022 | Carlier ............. B62K 21/12 |

FOREIGN PATENT DOCUMENTS

| | | | |
|---|---|---|---|
| EP | 1371545 A2 | 12/2003 | |
| EP | 1449759 A1 | 8/2004 | |
| EP | 4173936 A1 * | 5/2023 | ........ B62K 21/18 |
| GB | 816764 A | 7/1959 | |
| IT | 20090012 A1 | 3/2011 | |
| IT | 201800003726 A1 | 9/2019 | |
| JP | 200354476 A | 2/2003 | |
| JP | 4502551 B2 * | 7/2010 | ........ B62K 11/14 |
| WO | WO 9507836 * | 3/1995 | ........ B62L 3/02 |
| WO | 2008150159 A1 | 12/2008 | |
| WO | WO 2012020303 A2 * | 2/2012 | ........ B62K 19/30 |
| WO | WO 2023177290 A1 * | 9/2023 | ........ B62J 6/16 |
| WO | WO-2024012834 A1 * | 1/2024 | ........ B62K 23/02 |

OTHER PUBLICATIONS

Machine translation of WO 95/07836, Kyzlink et al., Mar. 23, 1995 (Year: 1995).*

* cited by examiner

BICYCLE HANDLEBAR

CROSS-REFERENCE TO RELATED APPLICATIONS

This application is the United States national phase of International Application No. PCT/NL2020/050705 filed Nov. 9, 2020, and claims priority to The Netherlands Patent Application No. 2024186 filed Nov. 7, 2019, the disclosures of which are hereby incorporated by reference in their entirety.

BACKGROUND OF THE INVENTION

Field of the Invention

The present invention relates to a bicycle handlebar, for a bicycle, arranged for providing at least one function for the purpose of at least one subsystem of the bicycle.

Description of Related Art

The use of the bicycle handlebar is, as a matter of course, known since the origin of the bicycle. It is therewith also known that the bicycle handlebar is usually provided with control accessories that require cables to the frame. These cables are vulnerable and are often considered to impair the appearance of the bicycle.

SUMMARY OF THE INVENTION

In order to improve state-of-the-art in this light, the present invention provides a bicycle handlebar, for a bicycle, arranged for providing at least one function for the purpose of at least one subsystem of the bicycle, the bicycle handlebar comprising:
a head tube part that during use, at least partly, substantially extends along the head tube,
a left handlebar bend with a handle end that extends to the left side from the head tube part,
a right handlebar bend with a handle end that extends to the right side from the head tube part,
wherein the bicycle handlebar comprises at least an internal feedthrough channel from at least one of the left handlebar bend and right handlebar bend and wherein the at least one internal feedthrough channel extends into the head tube part.

By means of such a bicycle handlebar according to the present invention, the internal feedthrough channel through the respective handlebar bend and the head tube part to watch the head tube is provided.

Figure 1:
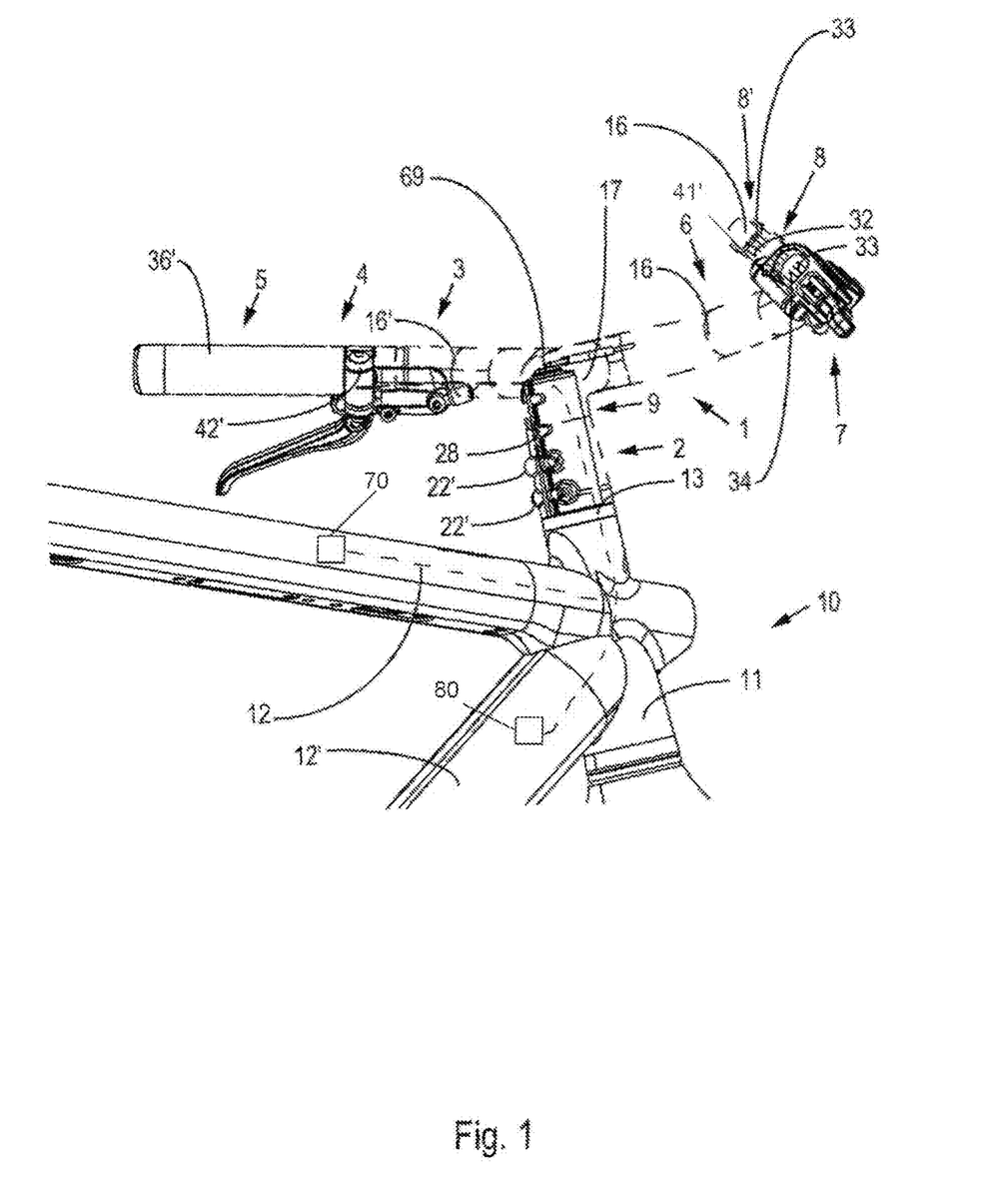
FIG. 1 relates to a partially exploded view in perspective of a first preferred embodiment according to the present invention.

According to a first preferred embodiment, the internal feedthrough channel extends from the head tube part to a control element, such as a controlling element, for the at least one subsystem 80 (see FIG. 1). By means of such control element, such as a button, keyboard or touchscreen that is available in, at or on the bicycle handlebar, a function of the bicycle or a function of a subsystem of the bicycle is advantageously operable. A signal or a control signal can be transmitted from the control element by the steering wheel, the head tube part and the left steering bend or right steering bend thereof in a further advantageous way.

Further preferably, the internal feedthrough channel extends from the head tube part to a through feed opening in a respective handlebar bend, substantially arranged or adjacent to the beginning of the handle. With these variants it is advantageously achieved that the feedthrough channel extends to a location for controlling that is suitably arranged relative to an end of a rider during riding of the bicycle.

Further preferably, the internal feedthrough channel extends from the head tube part to the end of a respective handlebar bend, wherein a part of the handlebar bend, preferably covered by a handle, is provided with at least an external slot for a hose or cable. With the help of such a variant, it is advantageously achieved that the throughput channel extends from the inside of the handlebar bend to beyond the end of the handlebar bend, and from there back towards a position along the handlebar bend, preferably at the location of the beginning of a handle to be arranged at the handlebar bend. With this, access to the inside of the handlebar bend is advantageously realized in a manner that a wire or cable or the like that is guided through the handlebar is fully protected. Furthermore, this preferred embodiment contributes to what the resistance of the access to the interior of the handlebar bend.

According to a further preferred embodiment, the bicycle handlebar comprising a recess in the left handlebar bend and/or the right handlebar bend for arranging therein of a brake fluid reservoir of a respective brake handle, preferably of a disk brake. With this, such a preferred embodiment provides a bicycle handlebar with brake fluid reservoir with a very slim appearance from the point of view of the rider. A part of the from the point of view visible part of the brake fluid reservoir appears to be part of the part of the handlebar bend that is visible from this point of view, or at least has a large overlap therewith, because of which the brake fluid reservoir protrudes from the steering bend to a relatively small extent. Preferably, to this end, the brake fluid reservoir is from this point of view elongated, elongated with rounded corners and/or oval.

According to a further preferred embodiment, a handle end comprises a shape element for cooperation with a shape element of the handle allowing placement of the respective handle about the handle end obstructing rotation of the handle about the handle end. Because of this, a stable placement, arrangement or seating of the handle relative to the handle end of the bicycle handlebar and/or handlebar bend is advantageously achieved. Preventing of rotation of the handle significantly reduces a risk of damage to a wire, cable or the like at the location of insertion thereof to the inside of the respective handlebar bend.

Further preferably, the shape element comprises at least a flat side for cooperation with a thereto adjacently arrangeable flat side of the handle. A flat side thus provides a suitable limitation of the rotation and stable arrangement of the handle relative to the respective left or right handlebar bend.

Further preferably, the handle comprises at least an internal slot for receiving of a respective hose or cable. With this, the respective hose or cable is guided able along the outside of the respective handlebar bend and along the inside of the respective handle. Therewith, the arrangement of the slot provides a similar protection, as well protection against access of dirt and/or moisture in the respective handlebar bend.

Further preferably, the external feedthrough slot of the respective handlebar bend and the internal slot are adjacently arranged for arranging therein of a respective hose or cable. With this, a useful surface of both slots together provide the possibility of either relatively easily produce call relatively small slots or a relatively large feedthrough.

According to a further preferred embodiment, the bicycle handlebar comprises a brake handle assembly with a brake oil reservoir, preferably arranged adjacent to the left or right handlebar bend, further preferably adjacent to the thereto arranged recess.

Further preferably, the bicycle handlebar comprises at least one control button for controlling of a function of a subsystem of the bicycle, which is substantially arranged near or adjacent a respective handle. The control button is further preferably integrated in the brake handle assembly, preferably arranged at the side of the respective handlebar bend directed towards the rear of the bicycle.

According to a further preferred embodiment, the head tube part, the left handlebar bend and the right handlebar bend are formed in one piece. With this, the whole bicycle handlebar including the head tube part may be removed as a whole from the bicycle.

For the purpose of a further preferred appearance, the handlebar bend comprises a substantially flattened tube structure. Further preferably, the top side of the head tube part has a close continuous surface.

According to a further preferred embodiment, the handle has a support providing shape for supporting of the hand. In cooperation with an example to be flattened inside to prevent a rotation, this provides a high level of comfort to the rider or the hand of the rider. The same can find support on the support providing shape while the handle remains solidly fixed.

Further preferably, the bicycle handlebar comprises an access opening for manipulating of a cable, preferably arranged in the head tube part or a connecting part thereof connecting with the respective left handlebar bend or right handlebar bend. Such an opening is for example functional for connecting two cable parts during assembly of the bicycle or the handlebar bend to the bicycle. To this end, the cable parts further preferably comprise a connector, of which it is further preferably provided that one of such connectors is fastened to the inside of the bicycle handlebar at or adjacent to the access opening.

Further preferably, the mutual orientation between the recess and the oil reservoir is such that an oil conduit is arranged behind the respective handlebar bend from the perspective of the rider of the bicycle.

According to a further preferred embodiment, the bicycle handlebar comprises clamping means for clamping of the head tube part about a head tube assembly, preferably embodied by means of a longitudinal slot in a wall of the head tube part, preferably arranged from the bottom side and/or created therein, together with clamping parts, such as bolts. With this, the bicycle handlebar is preferably attachable to a head assembly of which a part of that is cooperating with the bicycle handlebar protrudes from the head tube.

According to a further preferred embodiment, the bicycle handlebar comprises, or is combined therewith in a kit, at least one spacer, substantially embodied ring-shaped, for arranging thereof between a head tube of the bicycle and the head tube part. With this, it is advantageously achieved that the height of the bicycle handlebar may be adjusted while the space between the head tube and the bottom side of the bicycle handlebar is filled. Further preferably, the transitions between the head tube, the at least one spacer and the bicycle handlebar is flush such that an appearance of unity of design is achieved.

Further preferably, the at least one spacer is mountable when the bicycle handlebar is shifted abruptly, preferably without removal thereof, such as by open hingeability or compilability of the substantially ring-shaped of the spacer. With this, the height of the bicycle handlebar is adjustable by means of such an at least one spacer at a height that is suitable for the rider of the bicycle.

BRIEF DESCRIPTION OF THE DRAWINGS

Further advantages, features and details of the present invention will be further elucidated on the basis of a description of one or more preferred embodiments with reference to the accompanying figures. Similar yet not necessarily identical parts of different preferred embodiments may be indicated with the same reference numerals.

DESCRIPTION OF THE INVENTION

A first preferred embodiment (FIG. 1) according to the present invention relates to a bicycle handlebar 1. It comprises generally a head tube part 2, a left handlebar bend 3 and a right handlebar bend 6. At the left handlebar bend 3, a control unit 4 is arranged. At the right handlebar bend 6, a control unit 7 is arranged. Furthermore, the left handlebar bend comprises a handle unit 5 and the right handlebar bend comprises a handle unit 8.

The handlebar is mounted to a head tube assembly 9 that extends from the head tube 11 that is part of a frame 10 of the bicycle furthermore comprising a top tube 12 and a bottom tube 12'.

The head tube assembly 9 is in itself functionally mountable without the bicycle handlebar 1. This is visible in the FIGS. 1-3, wherein in FIG. 1, 3 the handlebar is shown in an exploded view and in FIG. 2, the head tube assembly is mountedly shown and extending from the head tube 11. The head tube assembly 9 is described after the following description of the bicycle handlebar 1.

A purpose of the present invention is realized by the bicycle handlebar according to this preferred embodiments. From the control units 4, 7, signal cables or electrical cables 41, 42 (partly shown, FIG. 4, 5) are feedable through from a respective control button 41' from control unit 7 and the respective control button 42' of control unit 4.

The electrical wire is arranged from the control unit through the handle unit 8 (see also FIG. 7) along the outside of the right handlebar bend 6 to the end of the right handlebar bend 6, still within the handle unit 8. To this end, the handle unit 8 comprises a slot 39 that is arranged in a surface 38 of the inside of the handle 8. Within the handle unit 8 and at the outside of the right handlebar bend 6, the cable 41 is arranged also partly within a slot 33 that is shaped in a flat surface part 32 of the end of the bicycle handlebar bend 6.

Figure 7:
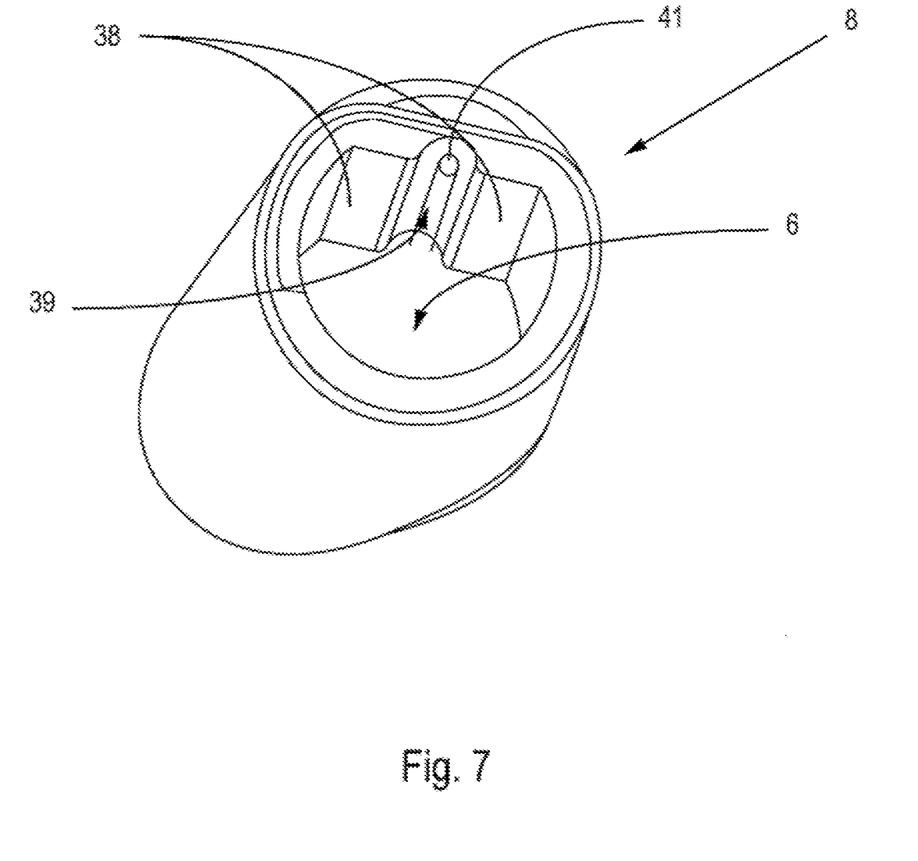
FIG. 7 relates to a further perspective view of a detail of the preferred embodiment according to FIG. 1.
Figure 8:
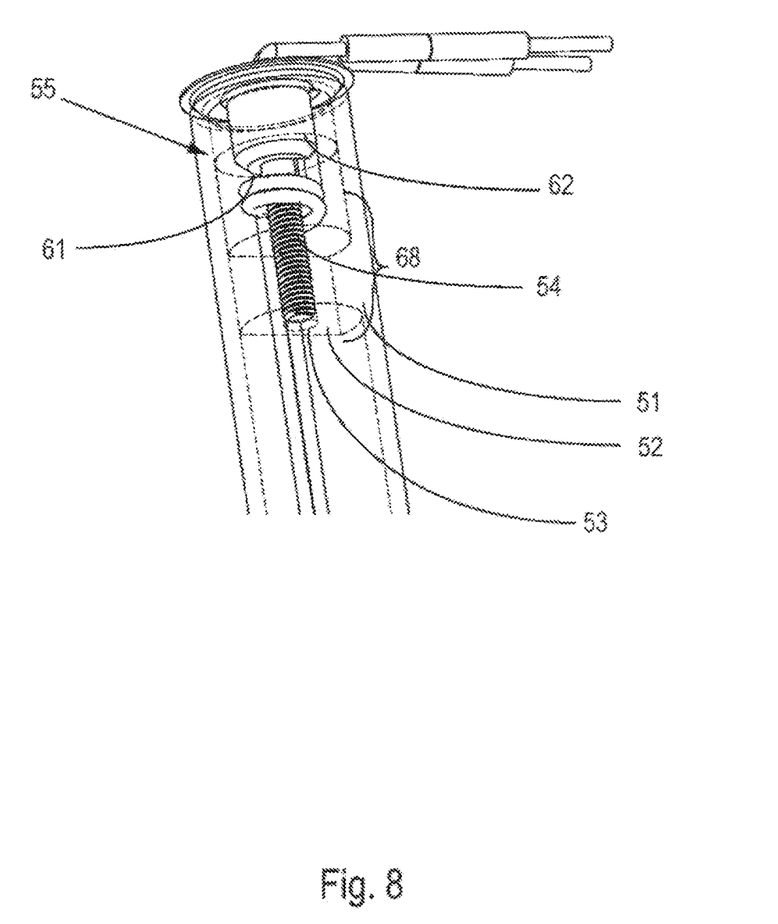
FIG. 8 relates to a further exploded view in perspective of the preferred embodiment according to FIG. 1.

The channel that is formed by the mutually adjacent slot 39 of the handle unit 8 and the slot 33 of the right handlebar bend 6 forms a substantially round channel for receiving of this cable 41. Such a channel between the inside of the handle and the outside of the handlebar bend is arranged in the longitudinal direction of the handlebar bend at the location of the handle. Here, a resulting substantially round channel is described, but it is also provided that each channel shape that is arrangeable within the understanding of the invention at such a location for one or more cables, wires, tubes or hoses is suitable within the understanding of the present invention.

An alternative for the cable guiding is a cable guiding via an opening in the respective handlebar bend directly at the location of the respective control unit.

At the end of the right handlebar bend 6, the cable 41 makes a turn into the right steering bend 6. To this end, either a space is provided at the inside of the respective handle, or a recess 53 at the location of the end of the channel is made through which the turn may be realized within the length of the respective and of the handlebar bend.

A hollow feedthrough channel 16 exists within the handlebar bend that extends from at least the entry location of the cable 41, or the other signal guide as indicated, to the head tube part 2 of the bicycle handlebar 1.

Figure 4:
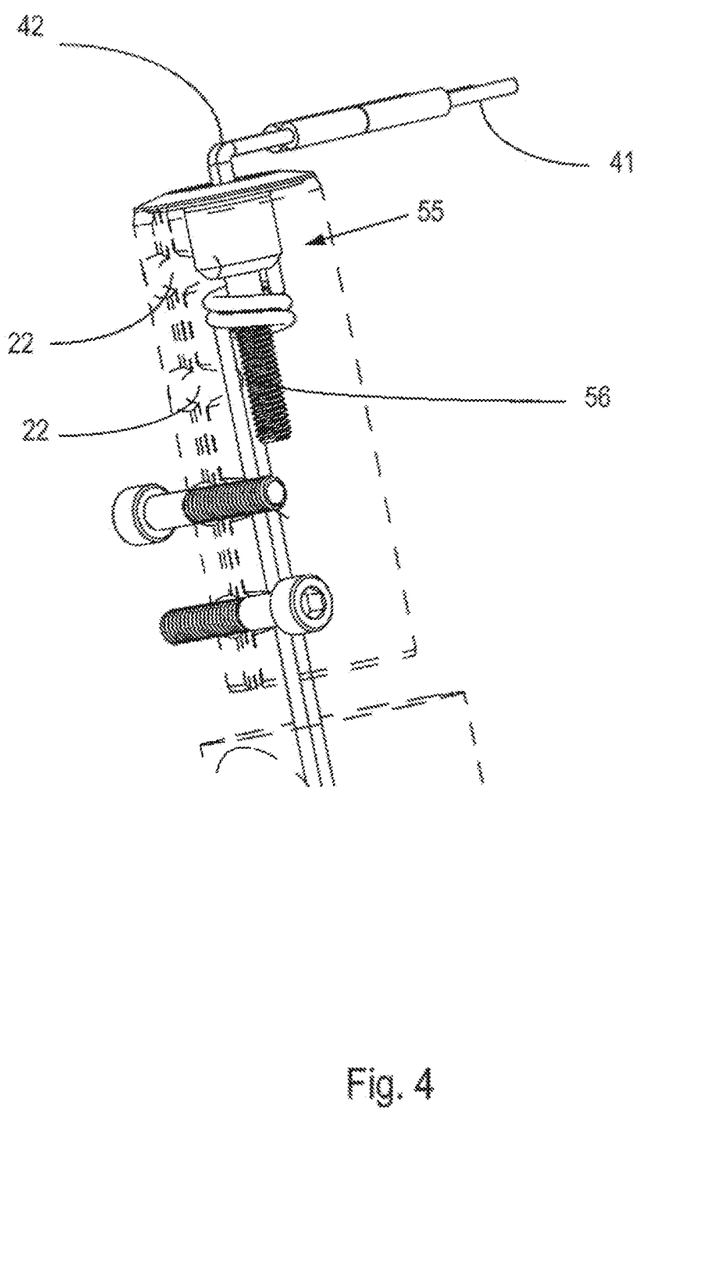
FIG. 4 relates to a further exploded view in perspective of the preferred embodiment according to FIG. 1.
Figure 5:
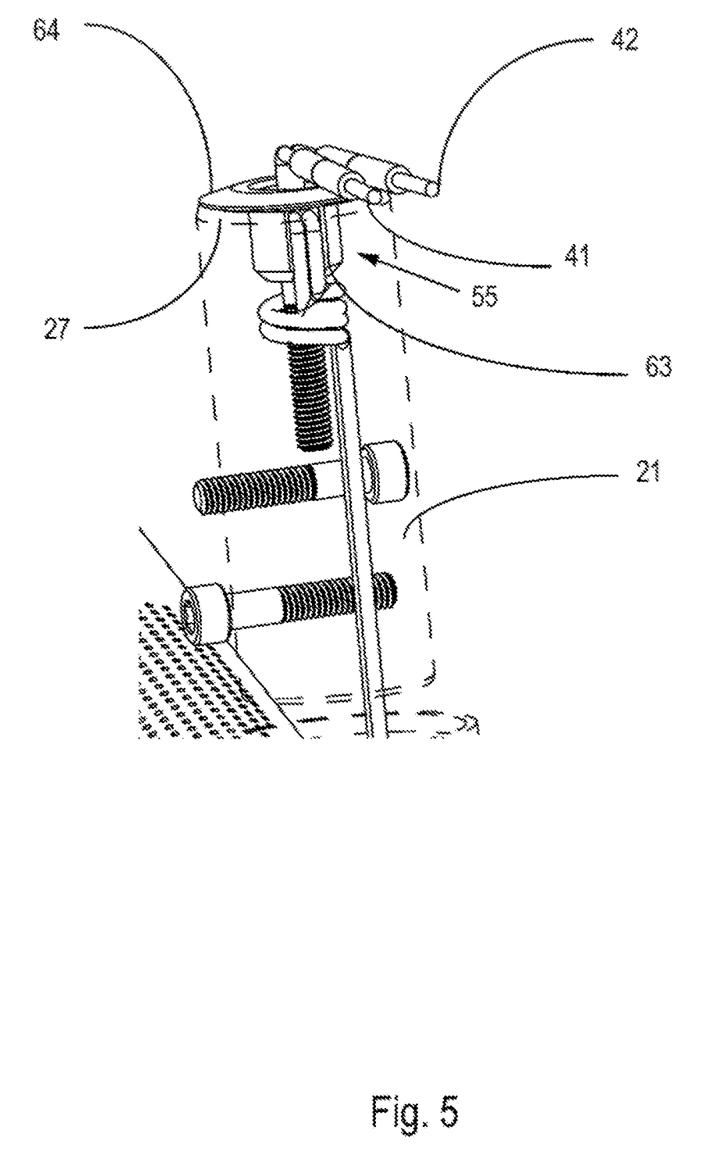
FIG. 5 relates to a further exploded view in perspective of the preferred embodiment according to FIG. 1.

To this end, the head tube part 2 of the bicycle handlebar comprises both a vertical part and a part that extends substantially horizontal from the vertical part. The vertical part serves the purpose of arrangement over the head tube assembly 9, while the substantially horizontal part forms a connection between the vertical part and the left handlebar bend and the right handlebar bend. Both the substantially horizontal part and the vertical part are hollow, forming a channel part 17 and thus form a whole with the channel part 16, 16' of the respective handlebar bend. With this, the cable 41 of the right handlebar bend may be fed through in the interior of the head tube part of the bicycle handlebar and the cable 42 from the left handlebar bend may be fed through in the interior of the head tube part of the bicycle handlebar (FIGS. 4, 5). The way the cables are further fed through the tube part is described in the following in greater detail.

The control units 4, 7 of the bicycle handlebar further comprise a handbrake handle 50 to for a respective disc brake. To this end, the control units each comprise a break-brake liquid reservoir 510. A brake fluid reservoir for a bicycle handlebar is a relatively bulky, large unit that detracts from the design of the bicycle. To this end, a combination solution is provided for the purpose of a more preferred appearance. The respective handlebar bend is provided with a recess 59 for partly receiving the brake fluid reservoir in the recess. Furthermore, the brake fluid reservoir is elongated or relatively flat arranged at the handlebar bend. The exiting brake fluid conduit is arranged at the control unit such that the outlet 53 thereof, during riding of the bike, is arranged behind the handlebar from a point of view of the rider, and because of this is substantially invisible from this point of view.

The result of the way of arranging of parts of the control unit and the cables and hoses leads to a minimum the invasive appearance from the point of view of the rider, and solid concealment of the operating cables which also raised robustness and lowers a risk of damage.

The flat inner surfaces 38 of the handle units 8 and the, in mounted states thereof cooperating, flat outer surfaces 32 of the respective and parts of the respective handlebar bend define a proper orientation therebetween and prevents rotation therebetween. This advantageously realizes that a support surface of the respective handles can absorb high support forces of the respective hand of the rider. With this, it is advantageously achieved that a predetermined optimal orientation of such a support surface, together with a relatively large size of such support surface is reliably achievable by means of such features of respective preferred embodiments according to the present invention. Accordingly, a riding comfort that is achieved with this is provided to the rider during the life expectancy of the respective parts in a consistent and reliable manner, there where rotatable handles according to the prior art either become let loose or become incorrectly adjusted.

The head assembly 9 as shown in the figures provides inventive advantages in itself and is applicable in combination with preferred embodiments as described in the above. The head assembly function substantially with a front fork bearing according to the prior art wherein inventive features according to the present invention extend above the total bearing of the head tube.

The head tube assembly comprises a front fork tube 51 that extends from the head tube 11 of the frame. The front fork tube 51 extends in substantially critical direction. Above the front fork pin 51, a tensioning cap 55 is arranged, for providing of a pulling tension to the front fork pin 51, that is used to keep the bottom front fork bearing under tension relative to the head tube.

The pull tension to the front fork tube 51 through the tensioning cap 55 is realized by a tensioning bolt 56, or the fixation member, that engages with a head thereof to the top side of a bottom 61 of the tensioning cap 55. The tensioning cap 55 comprises a bottom, and a therefrom upwardly extending substantially cylindrical wall 62 that transitions into a substantially ring-shaped flange 64 at the top side. When the tensioning cap is arranged in the head tube assembly, the flange 64 supports on the top edge 27 of tensioning sleeved 21 that in its turn is supported relative to the top side of a bottom head tube bearing or seated thereof. Because of this, the functioning of the tensioning cap is as follows.

In the front fork tube 51, a fixed or fixable screw thread element 52, the tensioning member is arranged, with a screw thread 53 that is for example embodied as a shaped block with an inner screws that, or a bridge or a star. The tensioning bolt 56, or the fixation member, is arranged with the had thereof at the top side of the bottom 61 of the tensioning cap and pulls the front fork tube upwardly by means of the screw thread 53 relative to the tensioning cap. With this, the flange of the tensioning cap pushes the tensioning sleeved 21 downward thereby adjusting and keeping the head tube bearings at the correct tension of use. Further preferably, the thread is thereto provided with friction means for preventing loosening of this setting.

With this, a head assembly is advantageously provided that is adjustable without a handlebar and that functions without handlebar. Furthermore, the head tube assembly according to the present preferred embodiment provides a cable feedthrough from outside the head assembly to inside the head assembly through an opening 63 in the tensioning cap. In the present tensioning cap, the opening 63 is substantially arranged in the cylindrical wall 62 of the tensioning cap. By such an arrangement, it is possible to guide cables 41, 42 through the wall along the head of the bolt (which is hidden behind the cables 41, 42 in the representation according to FIG. 5). Between the tensioning cap 55 and the screw thread element 52, a winding space is arranged for the purpose of winding of the wires 41, 42 therein. Such a winding provides play for prevention of damage to the cables when rotating the bicycle handlebar, and therewith the tensioning sleeved and the front fork tube.

Figure 2:
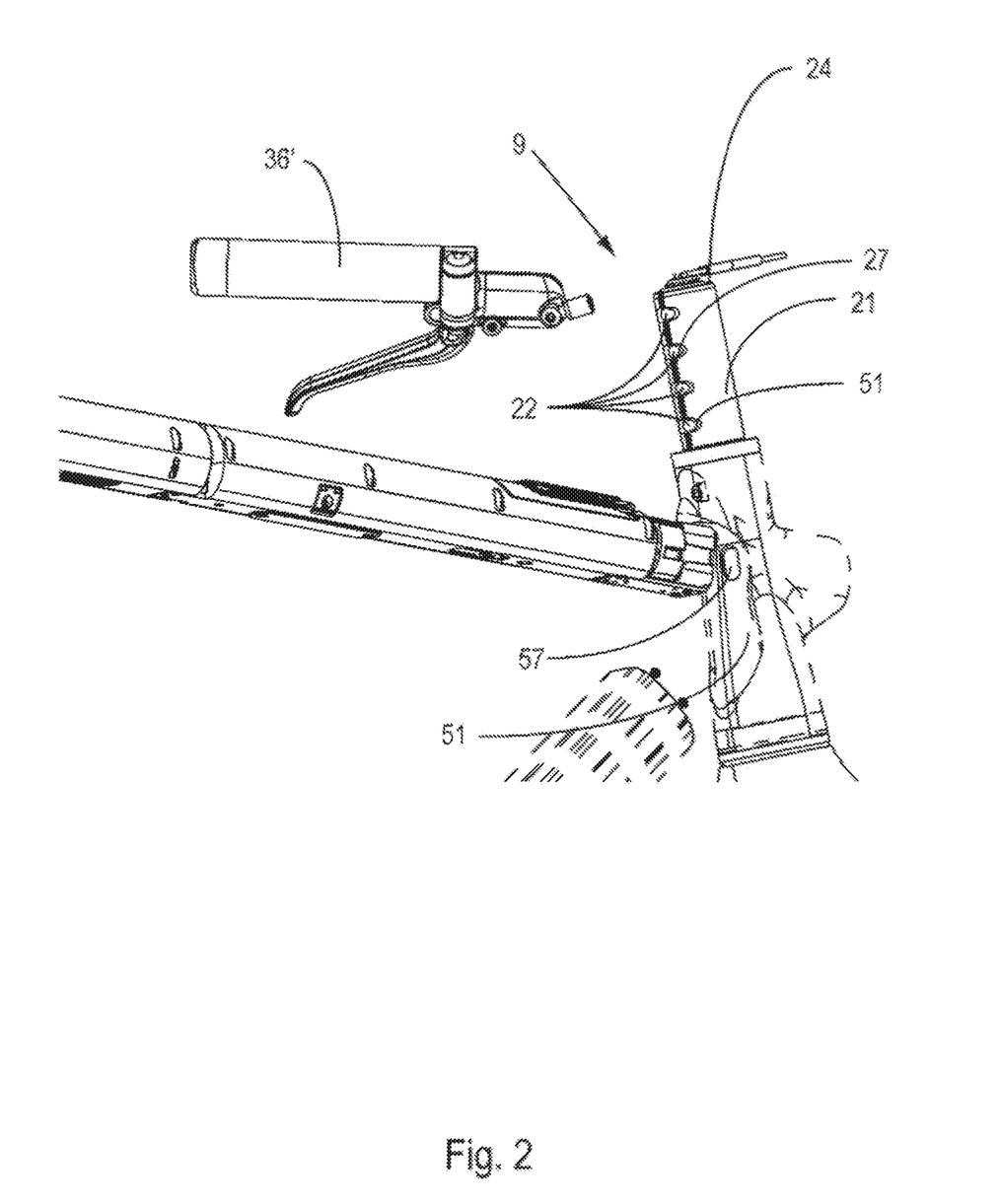
FIG. 2 relates to a further exploded view in perspective of the preferred embodiment according to FIG. 1.
Figure 3:
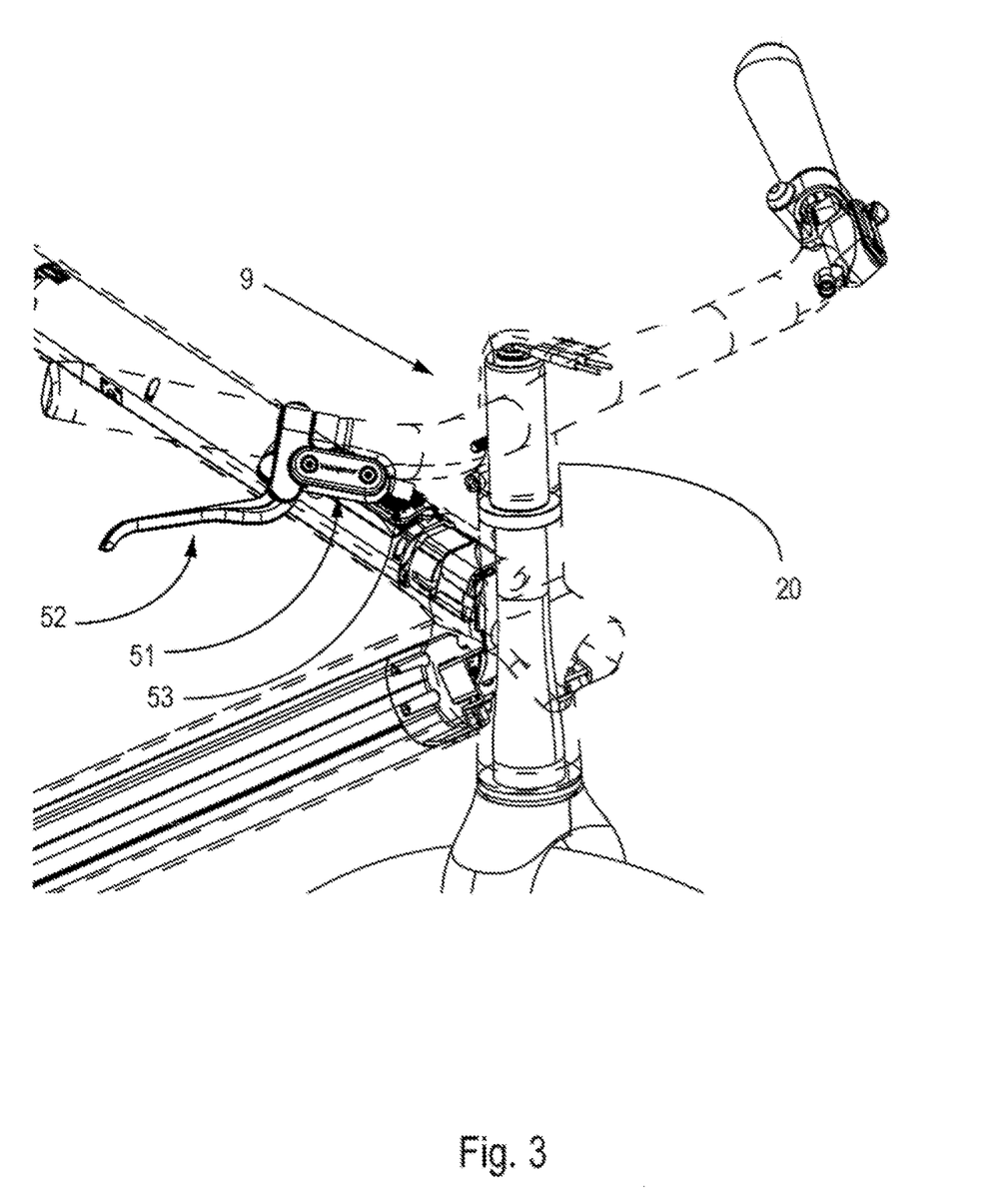
FIG. 3 relates to a further exploded view in perspective of the preferred embodiment according to FIG. 1.

Along the screw thread element 52, a feedthrough space is arranged for feeding therethrough of the cables 41, 42, downwardly in the front fork tube 51. Such as shown in FIG. 2, the front fork tube 51 comprises an opening 57 that is directed towards the top tube for reading through of the wires 41, 42, towards the top tube. Therewith, the wires of the operating buttons of the handlebar are connectable with a central control unit 70 of the bicycle that is arranged in the top tube, such as in a cassette therein. For the purpose of mounting of the handlebar, the tensioning sleeved is provided with four tensioning bolt slots 22 such that the bicycle handlebar is arrangeable at 3 different heights relative to the head assembly. The first height relates to the lowest wherein both the tensioning bolts are arranged in the lower to tensioning slots. The second heights relates to the middle height wherein the tensioning bolts are arranged in the middle tensioning bolt slots. The third height concerns the upper height wherein the two tensioning bolts are arranged in the two top tensioning bolt slots.

Figure 6:
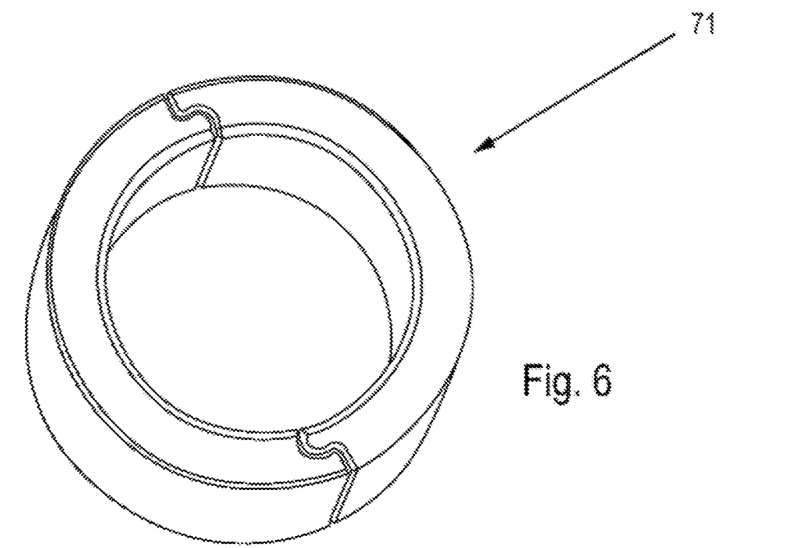
FIG. 6 relates to a further perspective view of a detail of the preferred embodiment according to FIG. 1.

For the purpose of filling the space between the upper side of the head tube and the bottom side of the bicycle handlebar, at least one, the space filling, substantially ring-shaped, spacer 71 is provided (FIG. 6). This spacer, or a stack thereof fills the space between the top side of the head tube and the bottom side of the bicycle handlebar. To this end, an individual spacer preferably provides a same height as a stitch between two consecutive tensioning bolt slots in the in the tensioning sleeved.

The spacer is preferably formed in a divisible manner. With this, preferably, a cross-section has been formed so that the segments of the spacer can be connected to each other by means of a snap connection. In addition the spaces are kept in place by the outer surface of the tensioning sleeved and the inner surface of each other.

Further preferably, the head assembly according to the present invention comprises a part that substantially extends in the extension of the head tube as well as a part at an angle thereof that preferably serves the purpose of connecting with a left handlebar bend and/or a right handlebar bend.

In this document, the term 'vertical' is used for the purpose of ease of description for among others the head tube part of the bicycle, the saddle tube and the head tube. To this end, the wording 'vertical' according to this document for the purpose of ease of description is equivalent to an angle under which a head tube and front fork tube extend, in order to avoid complicated wording relating to the angle at which a head tube and front fork tube extend in a practical manner.

A further preferred embodiment relates to a head assembly for a bicycle comprising:
  a front fork tube arranged to extend through a head tube of a frame of the bicycle,
  a tensioning assembly for tensioning of the headset assembly relative to the front fork tube, such as for rotation relative to the front fork tube by means of a suitable bearing, the tensioning assembly comprising
  a tensioning member, such as a bridge or star, preferably with an inner screw thread, arranged in the front fork tube, suitable for receiving a fixation tensioner, such as a tensioning bolt, preferably with an outer screw thread, and for receiving of a tensioning force of the headset assembly,
  a tensioning sleeve for arranging about a length of an end of the front fork tube and for extending somewhat beyond the end of the end of the front fork tube,
  a tensioning cap for applying the tension between the front fork tube and the tensioning sleeve by means of the fixation tensioner, wherein the headset assembly is suitable for functional mounting and tensioning by means of the fixation tensioner prior to mounting of a bicycle handlebar or handlebar bend to the headset assembly.

It is an advantage of a head assembly according to the present invention that it is mountable and thereby functional without having a handlebar with a handlebar According to the prior art mounted on the head assembly. Furthermore, such a head assembly allows for a simple mounting of a handlebar over a part of the head assembly that extends beyond the top side of the head tube part of the frame in an advantageous manner. With this, it is furthermore advantageously realized that an outer surface of such a handlebar can have a smooth surface with the outer surface of the head tube.

The head assembly according to the present invention is alternatively provided in combination with steering pin sided bearing seeds for the purpose of the head and/or for the purpose of a full set of head bearings. In light of an important goal of the present invention, such bearings have been omitted from the description and the drawings.

According to a first preferred embodiment, the tensioning sleeve is a substantially cylindrical element. With this, it is advantageously possible to provide a height to the head assembly for mounting thereon of such said handlebar.

Further preferably, the tensioning sleeve deformable relative to a longitudinal slot thereof, such as a longitudinal recess or sawcut. In other words, the tensioning sleeve according to this preferred embodiment comprises a longitudinal slot for tensioning thereof.

According to a further preferred embodiment, the tensioning sleeve comprises at least one fixation tensioner slot, such as a fixation tensioner recess, for receiving therein of a fixation tensioner of a bicycle handlebar. With this, discrete height setting positions of such a handlebar are advantageously defines. A handlebar that is mountable with at least one, such as two or three, transfers tensioning bolt is mountable over the tensioning sleeve with the at least one fixation tensioner slot wherein the first call position of the at least one tensioning bold is to coincide with a respective fixation tensioner slot. With this, it is advantageously realized that the handlebar is mountable at the respective height position. It is furthermore advantageously realized that movable of the handlebar without fully removing the respective tensioning bold is prevented. In case of somewhat loosening of the tensioning bolt, the position of the handlebar remains safe nonetheless.

For the purpose of advantageously providing of a feedthrough to the interior of the steering pin and/or the head tube part, in a further preferred embodiment, the tensioning cap comprises a feedthrough opening for feeding through of at least a wire or cable from outside of the front fork tube to the interior of the front fork tube. With this, a feedthrough from the outside of the steering pin and/or at tube is realized by means of the feedthrough opening.

Further preferably, the feedthrough opening serves the purpose of providing of the connection from the interior of the front fork tube to an interior of a bicycle handlebar that is arrangeable on the head assembly, preferably a handlebar with a head tube part arranged for arranging over the head tube assembly. With this, between the interior of the head tube part of the bicycle handlebar and the outside of the tube, a space is created in which the wire or cable is arrangeable, and further preferably may be fed through, through a left and/or right handlebar bend of the handlebar. Therewith, the wire or cable may be led to for example near the position of a hand on the handlebar during use of the bicycle in an advantageous manner. As such, the wire or cable is connectable with an operating element, such as a button, keyboard or touchscreen that is available in, at or on the handlebar.

According to a further preferred embodiment, the tensioning cap is provided with a recessed bottom for engagement therewith by the fixation spanner, such as embodied as a bolt. With the recessed bottom, space is available at the upper side of the tensioning cap for accommodating the feedthrough opening.

Further preferably, this place is realized in a substantially cylindrical wall between the tensioning cap and the recessed bottom, wherein preferably the feedthrough opening is at least partly arranged in the cylindrical wall.

According to a further preferred embodiment, the tensioning cap is provided with a tensioning sleeve engagement member, such as a substantially ring-shaped extending member for engaging with the tensioning sleeve, such as for downwardly tensioning thereof, such as for upwardly tensioning relative to the sleeve of the front fork tube by means of the tensioning member. Other forms of the tensioning sleeve engagement member are also provided, such as an interrupted ring-shaped extending member, such as a star-shaped extending member, such as an extending member comprising a bridge at two sides of the tensioning cap. Alternatively, a recessed bottom is provided that is somewhat smaller than the inner diameter of the steering tube with an inwardly directed recess in the cylindrical wall for receiving therein of the feedthrough opening or with a feedthrough opening in the bottom.

According to a further preferred embodiment, the head assembly comprises a winding space between the tensioning member and the tensioning cap for receiving therein of an amount of cable or wire, preferably at least a winding thereof for prevention of damage to the cable or the wire. This provides advantageously preventing of damage to the wire in case of rotation of the handlebar relative to the front fork tube and/or in case of rotation of the front fork tube relative to the frame or the head tube thereof.

In an advantageous manner, a rotation limiting stop is further provided, such as limiting the rotation to the left and/or a rotation limiting stop such as limiting the rotation to the right. Alternatively, a bicycle is provided comprising such a rotation limiting stop for limiting of the rotation of the front fork and/or the front fork tube relative to the head tube and/or the frame, in combination with a head assembly according to the present invention.

According to a further preferred embodiment according to the present invention, the front fork tube or steering pin is provided with a feedthrough opening, preferably substantially at the location of a top tube of the bicycle, such as for the purpose of feeding through of a wire or cable to the top tube of the bicycle. With this, in internal feedthrough for a wire or cable is realized towards the top tube and/or the frame of the bicycle.

According to a further preferred embodiment, a side of the tensioning sleeve that is located away from the tensioning cap is supported during use relative to an upper head tube part bearing of the bicycle and/or wherein during use, the underside of the front fork tube is supported by means of a bottom tube bearing of the bicycle. With this, it is advantageously realized that a handlebar that is mounted to the head assembly is rotatable relative to the head tube while the head assembly is mountable with the suitable tensioning relative to the front fork tube.

According to a further preferred embodiment, the head assembly comprises at least one spacer for arrangement during use over a top end of a head tube part of the frame and/or around the tensioning sleeve, for arranging thereon of a bicycle handlebar for fastening thereof to the head assembly. By means of such at least one spacer, a space between the bottom side of the bicycle handlebar at the top side of the head tube may be filled. Preferably, with this it is may be realized that the outer surface of the head tube part, the at least one spacer and the bicycle handlebar is substantially flush and/or smooth.

Preferably, with this, the spacer is embodied in a substantially ring-shaped, wherein it is preferably divisible in at least two segments for placement thereof without removal of the bicycle handlebar from the head assembly. It is advantageously achieved that the bicycle handlebar may be height adjusted and/or changed without removing the bicycle handlebar from the bicycle in an advantageous manner wherein such spaces that are divided into segments are those advantageously placeable.

Further preferably, the at least one spacer comprises segment ends suitable for mutually snapping together of the segments to a substantially ring-shaped by means of a snap connection. The mutual snap action is hereby preferably at least partly realized by a mutual cooperation between the outer shape of the tensioning sleeve and the inner shape of the segments of the spacer.

Alternatively, the spacer comprises segment ends suitable for longitudinally sliding the segment ends into each other.

A further preferred embodiment comprises an assembly of a head assembly according to one or more of the preceding claims and a bicycle handlebar, bearing the bicycle handlebar comprises at least an internal feedthrough channel from at least one of the left handlebar bend and a right handlebar bend, extending into the head tube part.

The present invention is described in the foregoing on the basis of preferred embodiments. Different aspects of different embodiments are expressly considered disclosed in combination with each other and in all combinations that on the basis of this document, when read by a skilled person of the area of skill, fall within the scope of the invention or are deemed to be read with the disclosure of this document. These preferred embodiments are not limitative for the scope of protection of this document. The rights sought are defined in the appended claims.

The invention claimed is:

1. A bicycle handlebar for providing at least one function of at least one subsystem of the bicycle, the bicycle handlebar comprising:
   a head tube part that during use, at least partly, extends along a head tube,
   a left handlebar bend with a handle end that extends to the left side from the head tube part, a right handlebar bend with a handle end that extends to the right side from the head tube part, wherein handles are arranged on lateral ends of the handlebar, and
   at least one control button arranged adjacent at least one of the handles for controlling the at least one function of the at least one subsystem of the bicycle, which control button is arranged laterally adjacent to an inner end of the respective handle of the respective handlebar bend,
   wherein the bicycle handlebar comprises at least one internal feedthrough channel from at least one of the left handlebar bend and the right handlebar bend, and
   wherein the at least one internal feedthrough channel extends into the head tube part, wherein the internal feedthrough channel extends from the head tube part to the at least one control button, and
wherein the bicycle handlebar is configured for transmitting a control signal from the control button for controlling the at least one function of the at least one subsystem of the bicycle.

2. The bicycle handlebar according to claim 1, wherein the at least one internal feedthrough channel extends from the head tube part to the control button for controlling of the at least one function of the at least one subsystem.

3. The bicycle handlebar according to claim 1, wherein the at least one internal feedthrough channel extends from the head tube part to a feedthrough opening in a respective feedthrough opening in a respective handlebar bend, arranged adjacent to the beginning of the handle.

4. The bicycle handlebar according to claim 1, wherein the at least one internal feedthrough channel extends from the head tube part to the end of a respective handlebar bend, wherein a part of the handlebar bend is provided with at least an external slot for a hose or cable.

5. The bicycle handlebar according to claim 1, wherein the left handle end and the right handle end comprise flat outer surfaces for cooperation with a flat inner surface of the handle allowing placement of the handle about the left handle end and the right handle end obstructing rotation of the handle about the left handle end and the right handle end.

6. The bicycle handlebar according to claim 5, wherein the handle comprises at least one internal slot for receiving of a respective hose or cable.

7. The bicycle handlebar according to claim 6, wherein an external feedthrough slot of the respective handlebar bend and the at least one internal slot are adjacently arranged for arranging therein the respective hose or cable.

8. The bicycle handlebar according to claim 1, the brake handle comprising a brake fluid reservoir.

9. The bicycle handlebar according to claim 8, wherein the at least one control button is integrated in the brake handle.

10. The bicycle handlebar according to claim 1, wherein the head tube part, the left handlebar bend and the right handlebar bend are formed in one piece.

11. The bicycle handlebar according to claim 1, the handle having a support providing shape for supporting of the hand.

12. The bicycle handlebar according to claim 1, comprising an access opening for manipulating of a cable.

13. The bicycle handlebar according to claim 1, comprising clamping means for clamping of the head tube part about a head tube assembly.

14. The bicycle handlebar according to claim 1, comprising at least one ring-shaped spacer for arranging thereof between the head tube of the bicycle and the head tube part.

* * * * *